United States Patent Office 3,520,883
Patented July 21, 1970

3,520,883
2,3-DIHYDRO-4H-1,2,4-BENZOTHIADIAZINE-4-OL 1,1-DIOXIDES
Harry L. Yale, New Brunswick, N.J., assignor to E. R. Squibb & Sons, Inc., New York, N.Y., a corporation of Delaware
No Drawing. Filed Oct. 20, 1967, Ser. No. 676,696
Int. Cl. C07d 93/32
U.S. Cl. 260—243                                          4 Claims

ABSTRACT OF THE DISCLOSURE

This invention relates to novel 2,3-dihydro-4H-1,2,4-benzothiadiazine-4-ol 1,1-dioxides of the general formula

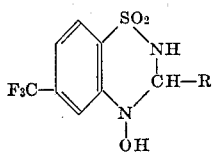

alkali-metal salts thereof, intermediates therefor and method of synthesis. The benzothiadiazine compounds are useful as anti-microbial agents or blowing agents.

SUMMARY OF THE INVENTION

The invention relates to new compounds of the formula (I)

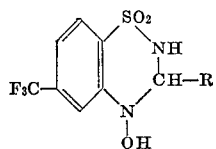

wherein R is hydrogen, lower alkyl or aralkyl, e.g., phenyl lower alkyl and to alkali metal salts. It also relates to the novel precursor of the compounds of Formula I, i.e., the intermediate of the formula (II)

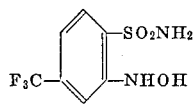

The intermediates of Formula II are produced by the catalytic hydrogenation of the compound of the formula (III)

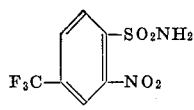

in which the nitro group, instead of being reduced to the expected amino group, is converted to the hydroxyamino group as in Formula II.

In Formula I, the symbol R represents hydrogen, which is preferred, a straight or branched chain lower alkyl group, e.g., methyl, which is a preferred group, ethyl, propyl, isopropyl, butyl, isobutyl, t-butyl, amyl and the like, or aralkyl, e.g., phenyl-lower alkyl such as benzyl, phenethyl or the like.

The new compounds of Formula I are synthesized by first catalytically reducing the compound of Formula III to yield the compound of Formula II. The catalytic reduction of the 2-nitro-α,α,α-trifluoro-p-toluenesulfonamide is effected by reducing with hydrogen at ambient temperature, preferably in an alcohol solvent under elevated pressure, e.g., atmospheric to about 50 p.s.i.g., in the presence of a metal catalyst, e.g., nickel or a noble metal such as platinum, palladium or rhodium, preferably on a carrier such as carbon. While catalytic hydrogenation of a nitro compound like that of Formula III is expected to result in reduction of the nitro group to an amino group, in this instance the compound of Formula II having a hydroxyamino group ortho to the sulfonamide group is obtained instead.

The compound of Formula II is converted to a compound of Formula I by the acid catalyzed reaction with an aldehyde, e.g., a lower alkanal such as formaldehyde, acetaldehyde, propionaldehyde, butyraldehyde or an aralkanal such as phenylacetaldehyde, phenylpropionaldehyde or the like. This reaction is effected under acid conditions, e.g., in the presence of a hydrohalic acid such as hydrochloric acid, hydrobromic acid or other mineral acid such as sulfuric acid, phosphoric acid or the like. A solvent, e.g., an alcohol such as methanol, ethanol or isopropanol is preferably used as the reaction medium.

The products of Formula I form salts with alkali metal hydroxides, e.g., by mixing equimolar amounts of the compound of Formula I and the hydroxide, e.g., in an alcohol such as ethanol, followed by concentration and drying to give the salt as a free flowing powder.

The compounds of both Formula I and Formula II (and the salts) are useful as antimicrobial agents, e.g., in combatting organisms such as *Staphylococcus aureus*, *Salmonella schottmuelleri* or *Proteus vulgaris*. Particularly they may be used as surface disinfectants, for example, by incorporating in a soap or other cleansing agent at a concentration of about 0.1 to about 1.0% by weight, in cleaning dairy or food processing equipment. These compounds are also useful as blowing agents for the formation of polyurethane foams.

The following examples are illustrative of the invention. Temperatures are all expressed on the centigrade scale.

Example 1

(a) 2 - nitro - α,α,α - trifluoro-p-toluenesulfonamide.—
A suspension of 3.67 g. (0.82 mole) of bis(2-nitro-α,α,α - trifluoro - p - tolyl)disulfide in 1800 ml. of 90% acetic acid is diffused with gaseous chlorine at 35–40° for 6 hours; the clear solution which forms is concentrated in vacuo from a hot water bath, the residue is treated with 500 ml. of toluene. The toluene solution containing 2-nitro-α,α,α-trifluoro-p-toluene sulfonyl chloride is added dropwise at room temperature to 500 ml. of aqueous ammonia (d. 0.9) and the solution is heated on the steam bath for 1 hour to give crude 2-nitro-α,α,α-trifluoro-p-toluenesulfonamide. This is extracted with 400 ml. of 20% aqueous sodium hydroxide, filtered, and the filtrate is treated with an excess of 20% aqueous hydrochloric acid. The solid is filtered, washed with cold water, and recrystallized from water to give 362 g. (84% yield) of the product, M.P. 169–170°, $$\lambda_{max.}^{EtOH}\ 276\ (Sh),\ 266\ m\mu$$

(ε 16,000, 16,500).

*Analysis.*—Calcd. for $C_7H_5F_3N_2O_4S$ (percent): C, 31.11; H, 1.86; N, 10.37. Found (percent): C, 31.14; H, 1.93; N, 10.33.

(b) 2-(hydroxyamino)-α,α,α-trifluoro-p-toluenesulfonamide.—30.0 g. (0.11 mole) of the product from (a), 5.0 g. of 5% Pd–C, and 300 ml. of absolute ethanol are shaken at 20–25° under 50 p.s.i. of hydrogen; approximately 0.5 hour is required for the uptake of 0.22 mole. The catalyst is filtered and the filtrate is evaporated to dryness to give 51.0 g. (90% yield) of colorless 2-(hydroxyamino-α,α,α- trifluoro-p-toluenesulfonamide, M.P. 184–185° (dec.) after recrystallization from water, $\lambda_{max.}^{EtOH}$ 313, 247, 213 m$\mu$ ($\epsilon$ 3100, 8200, 23,300).

Analysis.—Calcd. for $C_7H_7F_3N_2O_3S$ (percent): C, 32.83; H, 2.76; N, 10.93. Found (percent): C, 32.74; H, 2.73; N, 10.93.

(c) 2,3 - dihydro - 6-(trifluoromethyl)-4H-1,2,4-benzothiadiazin-4-ol 1,1-dioxide.—A solution of 2.54 g. (0.01 mole) of 2 - (hydroxyamino)-α,α,α-trifluoro-p-toluenesulfonamide, 0.82 g. (0.01 mole) of 37% aqueous formaldehyde, 1.0 ml. of 10% aqueous hydrochloric acid and 50 ml. of 95% ethanol is heated under reflux for three hours and concentrated to dryness in vacuo. The residue is recrystallized from 10% 2-propanol-90% water, to give a 95% yield of 2,3-dihydro-6-(trifluoromethyl)-4H-1,2,4-benzothiadiazin-4-ol 1,1-dioxide, M.P. 164–166°, $\lambda_{max.}^{EtOH}$ 320, 255, 213 m$\mu$ ($\epsilon$ 2600, 9200, 18,200).

Analysis.—Calc'd for $C_8H_7F_3N_2O_3S$ (percent): C, 35.82; H, 2.63; N, 10.44; S, 11.95. Found (percent): C, 36.05; H, 2.66; N, 10.41; S, 12.17.

Example 2

2,3 - dihydro - 3 - methyl-6-(trifluoromethyl)-4H-1,2,4-benzothiadiazine-4-ol 1,1-dioxide.—A solution of 2.54 g. (0.01 mole) of 2-(hydroxyamino)-α,α,α-trifluoro-p-toluenesulfonamide, 0.44 g. (0.01 mole) of acetaldehyde, 1.0 ml. of 10% aqueous hydrochloric acid and 50 ml. of 95% ethanol is heated under reflux for 24 hours and concentrated to dryness in vacuo. The brown sirupy residue is covered with 10% aqueous hydrochloric acid and kept at room temperature until it solidifies. The brown solid is recrystallized once from benzene and once from toluene to give 0.60 g. (21%) of 2,3-dihydro-3-methyl-6-(trifluoromethyl) - 4H - 1,2,4 - benzothiadiazine-4-ol 1,1-dioxide, M.P. 160–162° (dec.).

Example 3

Substituting 1.20 g. (0.01 mole) of phenylacetaldehyde for the acetaldehyde in the procedure of Example 2 yields 2,3 - dihydro - 3-benzyl-6-(trifluoromethyl)-4H-1,2,4-benzothiadiazine-4-ol 1,1-dioxide.

Similarly, substituting isobutyraldehyde or phenylpropionaldehyde for the acetaldehyde in Example 2, gives, respectively, the 3-isopropyl and 3-(2-phenethyl) analogs of the 3-benzyl compound.

What is claimed is:
1. A compound of the formula

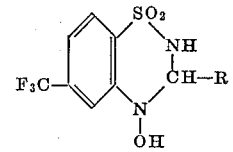

wherein R is hydrogen, lower alkyl or phenyl lower alkyl, and alkali metal salts thereof.
2. A compound as in claim 1 wherein R is hydrogen.
3. A compound as in claim 1 wherein R is methyl.
4. A compound as in claim 1 wherein R is benzyl.

References Cited

UNITED STATES PATENTS 3,318,879   5/1967   Wei et al.
3,379,735   4/1968   Sturm et al.

FOREIGN PATENTS 1,054,632   1/1967   Great Britain.

NICHOLAS S. RIZZO, Primary Examiner

U.S. Cl. X.R.

260—556; 424—246